Figure 1:
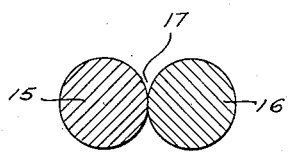
Figure 2:
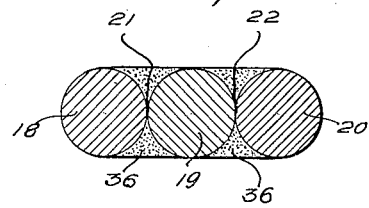
Figure 3:
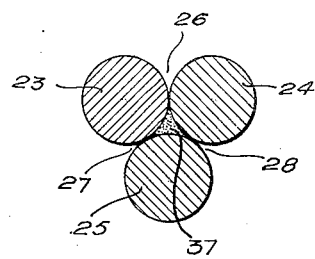

March 12, 1935.  S. W. MILLER  1,993,852

WELDING ROD

Original Filed Feb. 6, 1928

INVENTOR:
Samuel W. Miller,
Ella J. Miller, Executrix,
BY Byrnes, Townsend & Potter,
ATTORNEYS.

Patented Mar. 12, 1935

1,993,852

UNITED STATES PATENT OFFICE 1,993,852

WELDING ROD

Samuel W. Miller, deceased, late of Hollis, N. Y., by Ella Z. Miller, executrix, Hollis, N. Y.; said Samuel W. Miller, assignor, by mesne assignments, to Oxweld Acetylene Company, a corporation of West Virginia Original application February 6, 1928, Serial No. 252,314, now Patent No. 1,873,847, dated August 23, 1932. Divided and this application May 26, 1932, Serial No. 613,726

4 Claims. (Cl. 219—8)

This application is a division of a copending application of Samuel W. Miller, Serial No. 252,314, filed February 6, 1928, and patented August 23, 1932, Number 1,873,847.

This invention relates to improvements in metallic welding rods adapted to be fused by means of a high temperature gas flame or an electric arc and deposited on heated solid metal for the purpose of welding, filling or the like.

Generally speaking, the thickness of the work being welded by a gas flame, such as an oxyacetylene flame, determines the size of the welding flame which should be employed, although practical difficulties are encountered in designing very large welding nozzles or heads for welding very thick work, so there is a practical limit to the size of the welding flame which may be produced. It has been customary to use a single round metallic rod for welding purposes, but welding rods of very large diameter are seldom carried in stock or used for welding, no matter how thick the work may be or what the size of the flame may be. For example, the usual rod for welding steel of all thicknesses from one-half inch up is one-quarter inch in diameter. Considerable heat is therefore wasted and progress is slow when the usual single round wire is used with larger flames for welding the thicker work. For heavy steel welding, where a large flame is required to keep the work properly heated, two one-quarter inch rods have been secured together parallel to each other by binding wires. The objection to this wiring together is that the welder almost always bends the rods at some point about nine inches from the work to avoid the strain of holding straight rods nearly vertical to the work and to keep his hand holding the rods from the heat. This bending of the two wired-together rods causes the ends that are being melted off to separate, resulting in delays and difficulties in manipulating the rods.

The principal object of this invention is to provide an improved welding rod whereby weld metal may be more rapidly and economically deposited than in the use of the common welding rod of circular cross-section, especially when welding metal of considerable thickness or when filling large cavities. Another object is to provide a welding rod of larger cross-section area than the well-known circular welding rod, and to provide a rod which has one axis of its cross-section longer than the axis perpendicular thereto, and one which preferably is thicker intermediate its lateral edges than adjacent such edges, whereby (1) less gas or electric current is consumed per pound of metal deposited, (2) the heat of the welding flame may be confined and more fully utilized, (3) the hottest part of the welding flame may be applied to the thickest part of the rod, and (4) welding may be facilitated by turning the rod about its central longitudinal axis as occasion demands to present either the narrow or the wider side of the rod to the V-shaped groove between the bevelled edges of the work to be welded.

The above and other objects and the novel features of this invention will be apparent from the following description and the accompanying drawing, in which:

Figs. 1 to 5 inclusive are cross-sectional views of metallic welding rods embodying various features of this invention.

Figure 4:
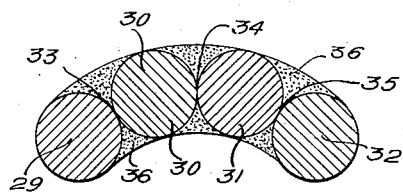

As already stated, certain objections are encountered in welding with two rods wired together. When such rods are bent to provide a handle whereby the welder may conveniently hold them at the desired inclination to the work, the rods, especially at the heated ends, spread apart, impeding the welder in his work as well as causing non-uniform welds. To overcome such objections there are permanently united in parallel contacting relation two or more rods of the same length, as shown in Figs. 1 to 4 inclusive. The permanent unions between the several parallel rods may consist of spot welds at short intervals apart, say two inches, throughout their length; or a continuous longitudinal joint between the parallel rods may be produced by electric resistance welding. Two or more welding rods permanently joined together in this way may be bent as desired and will stay together. As shown in Fig. 1, the rods 15 and 16 are permanently united by a longitudinal joint 17; in Fig. 2, the rods 18, 19 and 20 are permanently united into a unitary welding rod by longitudinal joints 21 and 22; in Fig. 3, the rods 23, 24 and 25 are arranged with their longitudinal axes at the apexes of a triangle and are permanently united into a unitary rod by longitudinal joints 26, 27 and 28; while the rods 29, 30, 31, 32, forming the unitary welding rod shown in Fig. 4, are united by longitudinal joints 33, 34 and 35. In all instances, the joints may be either spot welds or continuous resistance welds, and if desired, the spaces on opposite sides of the joints throughout the length of the composite rods may be filled with suitable fluxing material level with planes tangent to adjoining rods, as indicated at 36 in Figs. 2 and 4 for example. Similarly, suitable flux may be introduced into the space between the rods of Fig. 3, as indicated at 37, with or without flux in the outer V-shaped spaces adjacent the joints 26, 27 and 28. The flux is thus carried by and distributed throughout the length of the composite rod and is automatically supplied to the weld as required.

It will be observed that the welding rods shown in Figs. 1 to 5 inclusive are considerably wider than a single rod of circular cross-section having the same area. In gas welding especially, it is decidedly advantageous to employ a welding rod having one cross-sectional dimension substantially greater than the other. Particularly on this work, welding with the common single rod is uneconomical and slow because a large proportion of the heat passes the rod and is not effective in melting the rod nor sufficient to keep the base metal in a state of fusion to receive the melted rod deposited thereon. By presenting the improved composite rod to the work in such a manner that its broad side faces the weld, more of the flame and heat are confined between the rod and the weld and reflected back to the work and weld, so that heat otherwise wasted may be utilized for melting the rod and keeping the weld and base metal at a fusion temperature resulting in faster welding and greater economy. Moreover, by turning this type of rod so as to present its narrow side to the bottom of the V-groove, the welder may get to the bottom of the groove as easily as with a single round rod.

Figure 5:
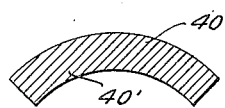

In some welding operations it is advantageous to provide the welding rod with a concave lower face which serves to confine the heat better than a flat broad face. In Fig. 4, for example, the several rods 29, 30, 31 and 32 are permanently united so their longitudinal axes and the weld unions lie on a curve, whereby one side of the composite rod is concave throughout its length. Another type of welding rod embodying this feature is shown in Fig. 5, wherein the rod 40 consists of a substantially rectangular metal strip rolled, bent or otherwise grooved so as to form a concave side 40', extending lengthwise of the rod.

While it is desirable in most instances that the plurality of integrally united rods shown in Figs. 1 to 4 shall have the same metallic composition, rods of different composition may be united in the same manner to provide a composite rod that will deposit weld metal of a composition that differs from any of the individual rods which make up the unitary rod.

For convenience, herein there is designated the width dimension taken perpendicular to the longitudinal axis of the rod, and the thickness dimension as the minor sectional axis.

What is claimed is:

1. A welding rod having a cross-section concave on one side and convex on the other side.

2. A welding rod comprised of a plurality of individual rods of circular cross-section, said rods being secured to each other at intervals along their length and arranged with their center lines lying in a cylindrical surface the width of the assembled rod being greater than its thickness.

3. A welding rod composed of a plurality of straight individual rods of circular cross-section, the individual rods being secured to each other along their length in such manner as to form a portion of a cylindrical surface and the width of the assembled rod being greater than its thickness.

4. A welding rod comprising a plurality of straight rods of circular cross-section arranged side by side in such manner as to form a portion of a cylindrical surface, said rods being of substantially identical composition and melting temperature and being secured to each other; and a fluxing material in the spaces between said rods; the width of the assembled rod being greater than its thickness.

ELLA Z. MILLER.
*Executrix of the Last Will and Testament of Samuel W. Miller, Deceased.*